(12) United States Patent
Galimberti et al.

(10) Patent No.: US 9,933,035 B2
(45) Date of Patent: Apr. 3, 2018

(54) METHODS FOR THE PREPARATION OF A FRICTION MATERIAL AND FOR THE MANUFACTURE OF A BRAKE PAD USING SUCH FRICTION MATERIAL

(71) Applicant: ITT ITALIA S.r.l., Lainate (IT)

(72) Inventors: Paolo Galimberti, Barge (IT); Agustin Sin Xicola, Barge (IT)

(73) Assignee: ITT Italia S.r.L. (IT)

( * ) Notice: Subject to any disclaimer, the term of this patent is extended or adjusted under 35 U.S.C. 154(b) by 0 days.

(21) Appl. No.: 15/148,591

(22) Filed: May 6, 2016

(65) Prior Publication Data
US 2016/0327112 A1 Nov. 10, 2016

(30) Foreign Application Priority Data
May 7, 2015 (IT) .................................. TO15A0242

(51) Int. Cl.
*F16D 69/02* (2006.01)
*F16D 49/00* (2006.01)
*F16D 55/225* (2006.01)

(52) U.S. Cl.
CPC ............ *F16D 69/026* (2013.01); *F16D 49/00* (2013.01); *F16D 55/225* (2013.01);
(Continued)

(58) Field of Classification Search
CPC ...... F16D 69/02; F16D 69/025; F16D 69/026; F16D 2200/006; F16D 2200/0065;
(Continued)

(56) References Cited

U.S. PATENT DOCUMENTS 2,465,858 A 3/1949 Ferguson
5,750,597 A * 5/1998 Waitkus .................. C08J 3/226
524/35
(Continued)

FOREIGN PATENT DOCUMENTS

EP 0 456 490 A2 11/1991
JP 2003 313398 11/2003
(Continued)

OTHER PUBLICATIONS

Italian Search Report for IT Patent Application No. TO2015A000242; dated Jan. 8, 2016; 6 pages.

*Primary Examiner* — Anna M Momper
(74) *Attorney, Agent, or Firm* — Barclay Damon, LLP

(57) ABSTRACT

Method for manufacturing an asbestos-free friction material having as component materials inorganic and/or organic and/or metallic fibers, at least one organic binder, at least one friction modifier or lubricant and at least a filler or abrasive. The raw components of the friction material are mixed together to obtain a raw mixture which is then molded to obtain a block or layer of friction material. The mixing step includes a first step of hot blending of at least part of the organic binder with at least part of the other components of the friction material by a rolling mill blender that is open to atmospheric pressure at a temperature lower than the polymerization temperature of the organic binder but greater than or equal to its softening temperature, in order to obtain a semifinished solid product. A second step of grinding the semifinished solid product reduces the product to a powder.

9 Claims, 3 Drawing Sheets

(52) U.S. Cl.
CPC .......... *F16D 2200/006* (2013.01); *F16D 2200/0034* (2013.01); *F16D 2200/0073* (2013.01); *F16D 2200/0086* (2013.01); *F16D 2250/00* (2013.01)

(58) Field of Classification Search
CPC ..... F16D 2200/0073; F16D 2200/0034; F16D 2250/00; F16D 2200/0086; C08J 3/07; C08J 3/12; B29B 7/52; B29B 7/56; B29B 7/7461; B27N 1/0218; B27N 1/0227; B27N 1/0281; B27N 3/18
See application file for complete search history.

(56) References Cited

U.S. PATENT DOCUMENTS

| | | | | |
|---|---|---|---|---|
| 2005/0200042 | A1* | 9/2005 | Chiba | B29B 9/04 264/109 |
| 2007/0023950 | A1* | 2/2007 | Chiba | F16D 69/026 264/140 |
| 2014/0209422 | A1* | 7/2014 | Takayama | C23C 8/32 188/251 M |

FOREIGN PATENT DOCUMENTS

| | | |
|---|---|---|
| JP | 2004 162055 | 6/2004 |
| JP | 2010 100740 | 5/2010 |

\* cited by examiner

METHODS FOR THE PREPARATION OF A FRICTION MATERIAL AND FOR THE MANUFACTURE OF A BRAKE PAD USING SUCH FRICTION MATERIAL

CROSS REFERENCE TO RELATED APPLICATIONS

This application is based upon Italian Patent Application No. TO2015A000242, filed May 7, 2015, under relevant sections of 35 USC §119, the entire contents of this application being incorporated by reference herein.

TECHNICAL FIELD

The present invention relates to a method for preparing a friction material to be used for manufacturing friction layers/blocks for friction elements such as braking elements, for example brake pads or brake shoes for vehicles, and/or clutch disks that are asbestos-free, for example belonging to the classes of friction materials known as NAO ("Asbestos-free Organic friction material"), "Low Steel" and "Semi-met".

In particular, the invention relates to a method of preparation that allows a friction material to be obtained that results in less wear to the friction layer/block deposited on the friction element (braking element or clutch disc) together with the stabilization in use of the friction levels.

PRIOR ART

The friction materials of the above type include five classes of components: a fibrous material made from inorganic and/or organic and/or metallic fibers, a binder, a "filler", one or more lubricants or friction modifiers, one or more abrasives. To a great extent asbestos was used in the past as the fibrous material, which material however presents considerable environmental problems and has well known toxic effects on human health and for this reason has been banned by legislation for a long time. This material has therefore been replaced with other materials, both inorganic, such as rock wool, wollastonite and fiberglass, and organic, such as aramid fibers and carbon fibers, as well as metallic such as copper, tin, iron, aluminum and steel powders or fibers, and other metals or metal alloys, such as bronze and brass. The binder is generally a thermosetting polymer, for example based on phenolic resins, which can be found on the market both in solid form (powder) and in liquid form, for example, if based on resoles. Various materials are used as a filler such as barite (barium sulfate), calcium carbonate, talc, magnesium oxide, vermiculite; as abrasives, zirconium silicate, zirconium oxide, alumina, silicon carbide, mica; as friction modifiers metal sulfides such as molybdenum disulfide, iron sulfides, copper, tin, graphite and/or coke. Other classes of materials are then added in smaller percentages such as, for example, rubber in powder or granule form, "friction dust", other organic materials.

For the purpose of preserving the environment and avoiding possible damage to human health, the various national and international standards impose more and more frequently the use of friction materials that are not only free of asbestos and heavy metals, but that also have a reduced or zero copper content (standards already approved by some American states and that will enter into force in the coming years).

Therefore, in the art the necessity exists of providing a friction material that is free of asbestos, heavy metals and copper, but at the same time preserving performances at least comparable to those of friction materials that include such substances.

EP2762743 teaches a method for manufacturing a friction material for vehicle brake pads, with the components being a fibrous material which is free of copper fibers, an organic binder and a friction modifier. This document explains how a lack of copper fibers normally involves a decay over time in the coefficient of friction, in particular in the presence of increased temperature due to repeated braking. This lengthens the braking intervals of the vehicle in an undesirable way. In addition, known mixtures of copper-free friction materials feature a certain fragility, which increases the risk of cracking.

According to the teachings of EP2762743, these problems are related to the creation, during the normal brake pad formation process, of micro gas bubbles which, in the absence of copper fibers, which have high thermal conductivity, reduce the heat dissipation rate in the finished brake pad. EP2762743 solves the problem by adopting a process for the manufacturing of brake pads that is more complex than previously known processes that are still currently used in most cases.

The known processes essentially involve three phases, namely:

blending of all of the raw materials, solid and, possibly, liquid (for example, in the presence of binders made from phenolic resins based on resoles), destined to form the friction material in a mixer, such as a Henschel, Loedige or Eirich blender, in order to form a raw or "green" mixture of friction material;

molding the mixture of raw friction material, which is in the form of a paste, onto an appropriately treated metallic support (the so-called "backplate") by applying heat and pressure to form a block or layer of friction material that adheres to the metallic support;

application to the brake pad thus formed of a thermal treatment which aims to terminate the polymerization of the binder and to evaporate the solvent residues and other gaseous elements that can form during the blending and molding processes.

The entire process may include further steps, such as painting, performing grinding and chamfering of the block of friction material, finishing, etc.

EP2762743 proposes the insertion, between the blending step of all of the raw materials and the molding step of the mixture of raw friction material, of at least one additional step wherein the mixture of raw friction material undergoes a kneading step within a sealed double worm gear kneader wherein the mixture is subjected to heat and pressure: in particular, the kneader is fitted with a compression lid capable of applying a pressure of between 0.3 and 1.0 MPa to the mixture whilst it is being treated.

This additional step, possibly followed by a further blending step within a blender, should reduce the formation of micro gas bubbles and thus create a more compact friction material with higher thermal conductivity, even without the presence of copper fibers.

The solution proposed by EP2762743 is however costly and complex and dramatically lengthens the time for the preparation of the mixture of friction material.

SUMMARY OF THE INVENTION

The purpose of the present invention is to provide a method for the preparation of a friction material for manufacturing friction layers/blocks for friction elements as braking elements, for example vehicle brake pads or break shoes, and/or clutch discs, that are free of asbestos and copper and the alloys therein. A method that is simple and economical, in particular as it does not require operations to be performed within sealed chambers and under pressure, and that does not require excessively long processing times and fitting smoothly into known and currently employed production processes.

The invention therefore relates to a method of preparing a friction material to be used for manufacturing friction layers/blocks for friction elements as braking elements, for example vehicle brake pads or brake shoes, and/or clutch discs, as defined in the claims.

In particular, the method according to the invention for preparing or manufacturing an asbestos-free friction material comprising inorganic and/or organic and/or metallic fibers, at least one organic binder, at least one friction modifier or lubricant and at least a filler or abrasive, comprises the steps of mixing with each other the solid raw component materials of the friction material in order to obtain a raw mixture; and of molding under pressure, at a temperature equal to or higher than a polymerization or curing temperature of the organic binder, the raw mixture, in order to obtain a block or layer of friction material.

According to the invention, the mixing step is not carried out by simply feeding the raw materials to a blender, as in the prior art, but rather it comprises a first, hot blending step which is carried out by a roll blender/mixer open to atmospheric pressure, wherein at least part of the organic binder and at least part of at least one other component material of the friction material, are fed to such first mixer which is provided with at least two rotating hot rollers and is open to atmospheric pressure in order to have said at least part of the organic binder and said at least part of at least one other component material of the friction material passing through the rollers in a gap delimited there between, at a temperature which is lower than the polymerization temperature of the organic binder but higher than, or equal to, the softening temperature of the organic binder, and preferably higher than a complete melting temperature of the organic binder.

In this way, the raw components of the friction material that participate in the first hot blending step mix with each other and with the organic binder, which takes it to a fluid state, under the high shear stress exerted by the rotating rollers of the blender, but operating at atmospheric pressure, thus obtaining at the output of the blender, due to the subsequent cooling of the paste thus formed, a semifinished solid product in the shape of chips or ribbon or sheet.

Subsequently, a grinding step is performed, for example by means of a ball or hammer mill, wherein the semifinished solid product is reduced to a fine powder, which is preferably sieved in order to reduce it to a particle size distribution of between 5 and 500 microns.

The mixing step according to the invention also comprises a second traditional step of blending the solid raw components of the friction material, which is carried out before, after, or both before and after, the steps of blending, using hot rollers, and of grinding of some or all of the solid components of the friction material and/or of the powder obtained from the grinding of the semifinished solid product; the second blending step is performed in a second mixer/blender, for example of the Henschel, Loedige or Eirich type.

According to an aspect of the invention, the first step of hot blending is performed using an organic binder, preferably exclusively in solid form, preferably in powder form, consisting of a thermosetting polymer or mixture of thermosetting polymers, preferably based on novolac phenolic resins optionally containing phosphorus and/or boron.

According to a further aspect of the invention, during the first hot blending step, in order to obtain the semifinished solid product, all of the organic binder and part or the totality of the component materials of the friction material having a fibrous structure are mixed with each other.

Example of Blending all of the Binder and of the Components of the Friction Material Preferably, in the first step of hot blending, all of the organic binder and each raw components, such as fibers and/or the friction modifier o lubricant, which are in very fine powder form, are mixed together in order to obtain the semifinished solid product, operating at a temperature that is higher than that of the liquefaction of the organic binder in powder form, so that this can, during the blending phase and due to the effect of the shear stress applied by the rollers, assume a completely fluid state in order to more easily incorporate the other components. The powder thus obtained by the grinding of the solid semi-finished product undergoes a sieving step.

Consequently, the powder obtained by grinding the semifinished solid product that is used to form the raw mixture has a controlled particle size distribution of between 5 and 500 microns.

Subsequently, the powder obtained by grinding the semifinished solid product is mixed in a Henschel, Loedige or Eirich type blender.

Example of Partially Blending the Binder and Some of the Components of the Friction Material Possibly, the raw components of the friction material to be subject to the first hot blending step are preemptively mixed together in a Henschel, Loedige or Eirich type blender, and only then fed into the roll blender open to the atmosphere.

The powder thus obtained by grinding the semifinished solid product undergoes a sieving step prior to being mixed with every other raw component of the friction material within a blender in order to obtain the raw mixture.

Consequently, the powder obtained by grinding the semifinished solid product that is used to form the raw mixture has a controlled particle size distribution of between 5 and 500 microns.

The first step of hot blending is performed by adding all of the organic binder, preferably in powder form, and at least one solid raw component of the friction material to a hopper arranged above at least one pair of motorized and contra-rotating heated cylinders.

Process of Pressing and of Mixture Composition

The method according to the invention includes further a molding step, for example, under heat and under pressure, of the raw mixture, which is performed in the traditional way, with the only difference being that among the components placed into the die there is the powder obtained by grinding the semifinished solid product obtained by blending some of the desired components, appropriately selected, or all of the components of the desired friction material, using the motorized roll blender open to the atmosphere. In this molding step, the raw mixture is placed into a die within which a suitably treated metallic support or backplate is also arranged, so that during the molding step, not only is the layer or block of friction material formed, but the adhesion of such a layer or block to the metal support is also obtained.

The friction material is produced using the method of the invention by evenly mixing the specific amounts described above of fibrous material, binder, friction modifiers and a filler at least in part by means of hot blending at atmospheric pressure in a roll blender and the subsequent grinding of a semifinished solid product obtained from the roll blender and preceded and/or followed by a traditional blending step within a suitable blender, for example a Henschel, Loedige or Eirich blender.

The brake pad molding is carried out at a temperature between 60 and 250° C. at a pressure from 150 to 1800 Kg/cm2 for a duration between 3 and 10 minutes or else preforming the raw mixture within a die and thereafter molding at a temperature from 100 to 250° C. at a pressure from 150 to 500 kg/cm$^2$ (14.7-49 MPa) for a duration from 3 to 10 minutes.

Alternately, the raw mixture can be molded in order to obtain the block of friction material, which is subsequently glued to the metal support.

The invention also relates to a friction element, in particular a brake pad or shoe, presenting a layer or block of friction material made from the friction material obtained according to the method described above.

The invention finally relates to a braking system comprising an element to be braked constituted by a brake disc or shoe made from cast iron or steel and at least one braking element constituted by a brake pad or shoe designed to cooperate by means of friction with the element to be braked, wherein the braking element presents a friction layer or block which is intended to cooperate with the element to be braked and which is made from the friction material obtained using the method described above.

The components of the composition or raw mixture of the friction material to be manufactured according to the invention can be the components used in friction materials that are already known in the art.

In particular, the component consisting of fibers may include any organic fiber or inorganic fiber other than asbestos, or else any metallic fiber that is commonly used in friction materials. Illustrative examples include inorganic fibers such as fiberglass, rock wool, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile), metallic fibers such as, for example, steel fibers, stainless steel, aluminum fibers, zinc, etc.

The fibers can be used in the form of either short fibers or powder.

In order to ensure sufficient mechanical strength, the quantity of fibers is preferably between 2% and 40% by volume compared to the total volume of the friction material and more preferably between 15% and 30% by volume.

In the method of the invention an organic or inorganic filler is also used as a raw component.

Numerous materials known in the art can be used as organic or inorganic fillers. Illustrative examples include calcium carbonate precipitate, barium sulfate, magnesium oxide, calcium hydroxide, calcium fluoride, slaked lime, talc and mica.

These compounds may be used alone or in combinations of two or more of them. The quantity of such fillers is preferably between 2% to 40% by volume based on the total composition of the friction material.

The organic binder can be any binder known and commonly used in friction materials and in general it is a thermosetting resin or a mixture of thermosetting resins.

Illustrative examples of suitable binders include phenolic resins, melamine resins, epoxy resins; various modified phenolic resins such as epoxy-modified phenolic resins, oil-modified phenolic resins, alkylbenzene-modified phenolic resins and acrylonitrile-butadiene rubber (NBR).

Any one or a combination of one or more of these compounds can be used. In order to ensure sufficient mechanical resistance and wear resistance, the binder is included in an amount preferably between 2% to 50% by volume based upon the total composition of the raw mixture or the final friction material obtained.

The friction modifier (which may include all or part of the filler) may be an organic filler, such as cashew nut powder, rubber powder (pulverized tread rubber powder), a variety of non-vulcanized rubber particles, a variety of vulcanized rubber particles, an inorganic filler, such as barium sulfate, calcium carbonate, a calcium hydroxide, vermiculite and/or mica, an abrasive, such as silicon carbide, alumina, a zirconium silicate, a lubricant, such as molybdenum disulfide, a sulfide of tin, a zinc sulfide, iron and non-ferrous sulfides, various metallic particles different from copper and copper alloys, and/or a combination of all of the above.

The abrasives used in the present invention can be classified as follows (the following list is only indicative, not necessarily exhaustive and non-limiting):

Mild abrasives (Mohs 1-3): talc, calcium hydroxide, potassium titanate, mica, kaolin;

Medium abrasives (Mohs 4-6): barium sulfate, magnesium oxide, calcium fluoride, calcium carbonate, wollastonite, calcium silicate, iron oxide, silica, chromite, zinc oxide;

Strong abrasives (Mohs 7-9): silicon carbide, zirconium sand, zirconium silicate, zirconia, corundum, alumina, mullite.

The content of the friction modifier, according to the desired friction characteristics, is preferably between 40% to 80% by volume compared to the volume of the entire material.

In general, the components of the friction material employed in the method are as follows:
1. binders
2. fillers
3. lubricants/friction modifiers
4. abrasives (which may form part of the fillers)
5. fibers (inorganic/organic/metallic)
6. metallic powders Curing and Painting The resulting molded article (brake pad) is typically post-cured by means of thermal treatment from 150 to 400° C. for a duration between 10 minutes to 10 hours, it is then spray-painted or powder-painted, kiln-dried and possibly machined where necessary to produce the final product.

The friction material obtained by means of the method of the invention can be utilized in applications such as disc pads, jaws and linings for automobiles, trucks, railroad cars and other various types of vehicles and industrial machines or else in clutch discs.

BRIEF DESCRIPTION OF THE DRAWINGS

The present invention will now be described in more detail with reference to the following practical non-limiting embodiment examples and with reference to FIGS. 1 to 3 of the appended drawings, wherein.

DETAILED DESCRIPTION

The examples and comparative examples are reported here by way of illustration and are not intended to limit the invention.

Figure 1:
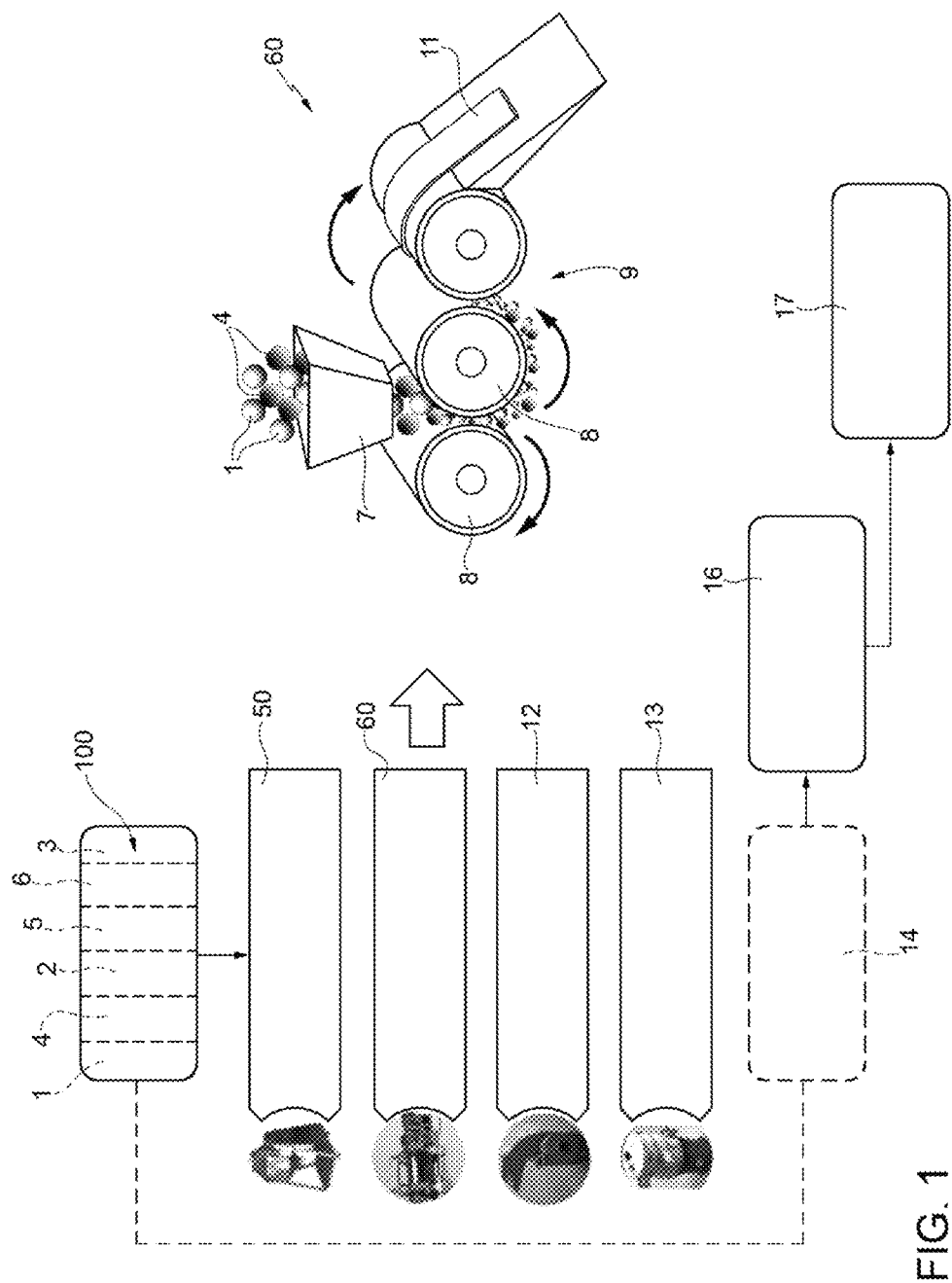
FIG. 1 illustrates schematically by means of blocks the method for manufacturing a friction material according to the invention highlighting schematically one of the steps that characterizes the method of the invention.

With reference to FIG. 1, a non-limiting implementation is illustrated schematically in blocks of a method for obtaining a friction material according to the invention.

The block indicated with 100 represents the set or complex of raw component materials of the required friction material: this block is composed of, indicated with hatching, an organic binder 1, fillers 2, lubricants or friction modifiers 3, abrasives 4, fibers 5 and metallic powders 6.

The block indicated with 50 represents a mixing step, for example performed in a Henschel, Loedige or Eirich type blender, of all or only part of the raw component materials of the block 1.

The block indicated with 60 represents a characteristic step of the method of the invention consisting of a hot blending step of some or all of the raw components of the block 100, possibly pre-mixed or not, in correspondence to the block 50. If only some of the raw components of the block 100 are blended in the blending phase according to the block 60, these must be in accordance with a preferred embodiment of the invention, selected from at least part and, preferably, all of the organic binder 2, which should preferably be solid and in the form of a powder or granules and at least part of the other components. According to the prospective expansion of the block 60 shown schematically in FIG. 1, during this step the raw components, at least consisting of part or all of the organic binder 2 and of part or all of the remaining components of the friction material, possibly but not necessarily pre-mixed in the block 50, are fed into a hopper 7 and made to fall from said hopper, under atmospheric pressure conditions, between two (or more) heated and motorized counter-rotating rollers 8. The rollers 8 are heated to a higher temperature than the softening temperature and, preferably, higher than the complete melting temperature of the organic binder but below the polymerization or curing temperature of the organic binder, which is a resin or mixture of thermosetting resins, in such a way as to bring the organic binder up to a temperature that is greater than or equal to the softening temperature but lower than its polymerization temperature in order to maintain the ability of the organic binder to soften or liquefy again.

The rollers 8 and the hopper 7 form part of a roll blender 9 which is open to the atmosphere, therefore not pressurized. Within this blender 9 the raw component materials of the desired friction material are subjected to a high shear stress in the presence of the organic binder in the fluid state. At the output of the roll blender 9 a semifinished solid product 11 in the form of chips or ribbon or sheet is produced.

The rollers 8 are made to rotate at a speed between 10 and 30 revolutions/minute and are maintained at a temperature between 40 and 150° C. The gap between the rollers 8, which determines the magnitude of the applied shear stress and the thickness of the semifinished product 11 at the output, is between 0.01 and 5 mm.

The block indicated with 12 represents a grinding step, preferably performed in a ball or hammer mill, of the semifinished product 11, which is reduced to the form of a powder.

The block indicated with 13 represents a sieving or screening step of the powder obtained from the grinding of the semifinished product 11, which is made to have a controlled particle size distribution between 5 and 500 microns.

The block indicated with 14 and illustrated with hatching represents an optional further mixing step using a Henschel, Loedige or Eirich blender, of the predefined particle size powder obtained from the grinding of the semifinished product 11 with any other raw component materials of the desired friction material, for example consisting of all or part of the friction modifiers and/or fillers, that did not participate in the blending step in the block 60.

Finally, the block indicated with 16 represents a traditional molding step of a block or layer of friction material on a metallic support in order to obtain a braking element, typically a brake pad, obtained by feeding at block 16 a raw mixture of component materials of the friction material to be obtained at the output of block 14 or, directly, from the block 13. The block indicated with 17 represents an optional known step of thermal treatment of a braking element obtained using the method described.

EXAMPLE—1

Five formulations were prepared, marked with the initials AMFN/194, prepared using the traditional method, and 329, 330, 331 and 328, respectively, with a composition that is similar/identical to that of the formulation AMFN/194 and obtained using the method of the invention, changing the raw component materials subjected to hot blending with rollers.

The compositions of the five formulations described above are shown in table 1 below.

TABLE 1

| FORMULA | AMFN/ 194 | MFN/ 328 | MFN/ 329 | MFN/ 330 | MFN/ 331 |
|---|---|---|---|---|---|
| Aramid fiber | 6 | 6 | 6 | 6 | 6 |
| friction powder | 8 | 8 | 8 | 8 | 8 |
| Graphite | 10 | 10 | 10 | 10 | 10 |
| phenolic resin | 23 | 23 | 23 | 23 | 23 |
| Silicates | 9 | 9 | 9 | 9 | 9 |
| Mild abrasive | 6 | 6 | 6 | 6 | 6 |
| Filler | 5 | 5 | 5 | 5 | 5 |
| Sulfides | 3 | 3 | 3 | 3 | 3 |
| Strong abrasive | 13 | 13 | 13 | 13 | 13 |
| Medium abrasive | 17 | 17 | 17 | 17 | 17 |
| TOTALS | 100 | 100 | | | |

The components shown in Table 1, which indicates values of % by volume compared to the total volume of the blend/mixture were uniformly blended within a Loedige blender in the case of the AMFN/194 mixture.

In the case of the MFN329 mixture at least 40% of the envisaged phenolic resin and mild abrasive content was treated according to the invention in a hot roll blender at a temperature of 75° C., with the rollers rotating at a speed of 20 g/min. and with a gap between the rollers of 1 mm, obtaining a semifinished product in sheet form with a thickness of 1.3 mm, which was subsequently ground and sieved to obtain a powder having a particle size between 5 and 500 microns and preferably between 5 and 250 microns. The powder was mixed with the remaining components in a Loedige blender.

In the case of the MFN330 mixture the same procedure was followed as with the MFN329 mixture, though mixing together, using the roll blender, a phenolic resin and a medium abrasive; in the case of the MF 328 mixture, a phenolic resin, a medium and strong abrasive were mixed together; in the case of the MFN331 blend a phenolic resin and a strong abrasive were mixed together.

Subsequently, all of the mixtures/compositions were subjected to an identical molding and thermal treatment process, subjecting them to molding within a die under a pressure of 20 tons for 3 minutes at a temperature of 160° C., then cured with 240 minutes of thermal treatment at 210° C., thus producing brake pads with a friction material of a substantially identical composition but obtained using different processes.

The brake pads produced as described were subjected to the following tests:

Efficiency tests comprising: bedding in braking events, braking events at different fluid pressures, "cold" evaluation braking events (<50° C.), freeway simulation braking events, two series of high energy braking events (first FADE test) interspersed by a series of regenerative braking events. From this test it is also possible to extrapolate, in a manner known to a person skilled in the art, the wear to which the pad is subjected.

Some comparative test results are reported in FIG. 3 of the annexed drawings and in table 2 below.

Figure 3:
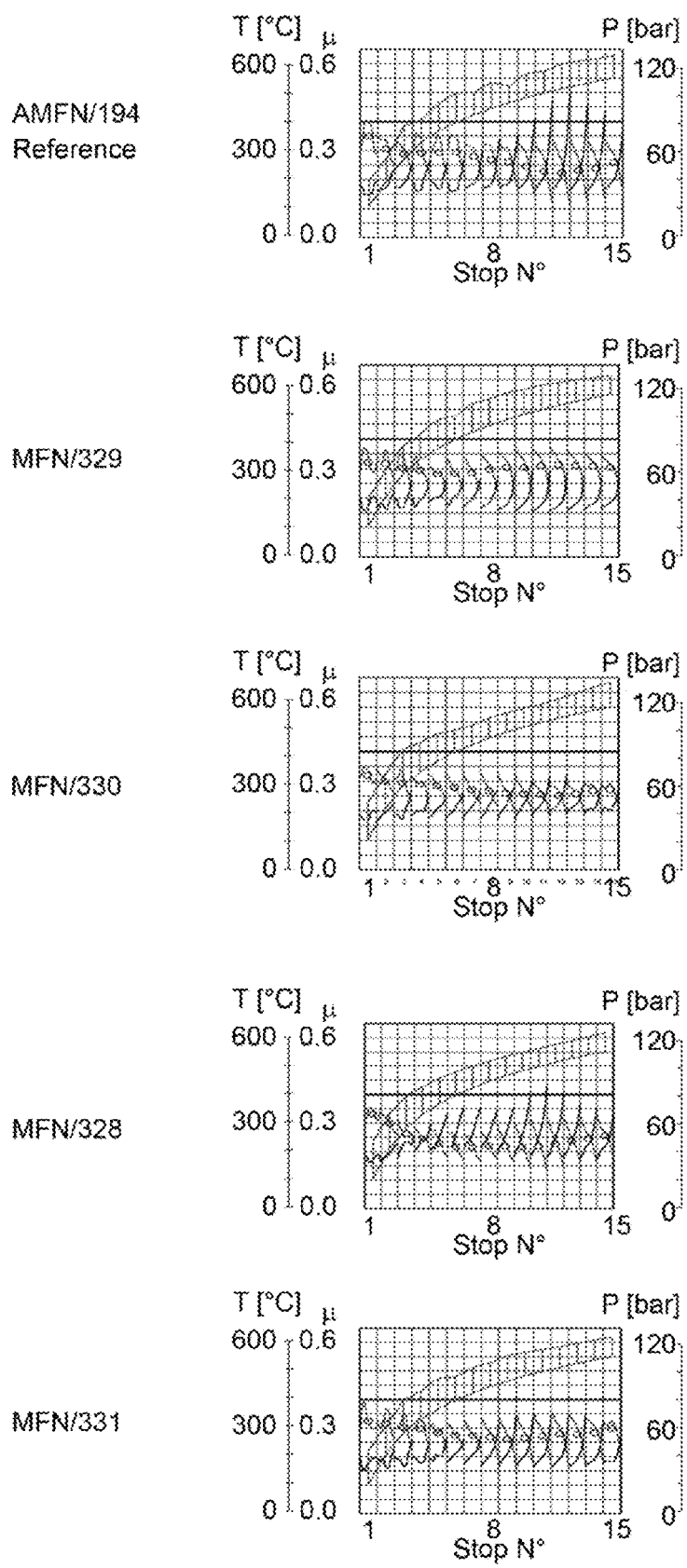
FIG. 3 illustrates the results in graphical form of braking efficiency tests on the same friction material made using traditional methods and the method of the invention.

From an examination of FIG. 3 it is evident that the braking coefficient remains more constant under equal conditions in the case of mixtures MFN329, 328, 330, whilst there are great variations in the case of the MFN331 mixture.

TABLE 2

| FORMULA | AMFN/ 194 | MFN 328 | MFN 329 | MFN 330 | MFN 331 |
|---|---|---|---|---|---|
| Outboard Pad Wear [gr] | 26.8 | 20.1 | 21.7 | 23.7 | 25.4 |
| Inboard Pad Wear [gr] | 25.5 | 19.8 | 21.7 | 22.1 | 25.3 |

Comparing the wear of the brake pads on the outboard side (towards the outside of the vehicle) and the inboard-side (towards the inside of the vehicle) there is an obvious reduction in the wear of the pads for the formulations/mixtures MFN329, 328 and 330 manufactured according to the invention compared to the comparison (reference) formulation AMFN/194 and to the MFN331 formulation wherein only a non-fibrous material as the strong abrasive was treated together with the phenolic resin for blending using the rolling mill blender.

Figure 2:
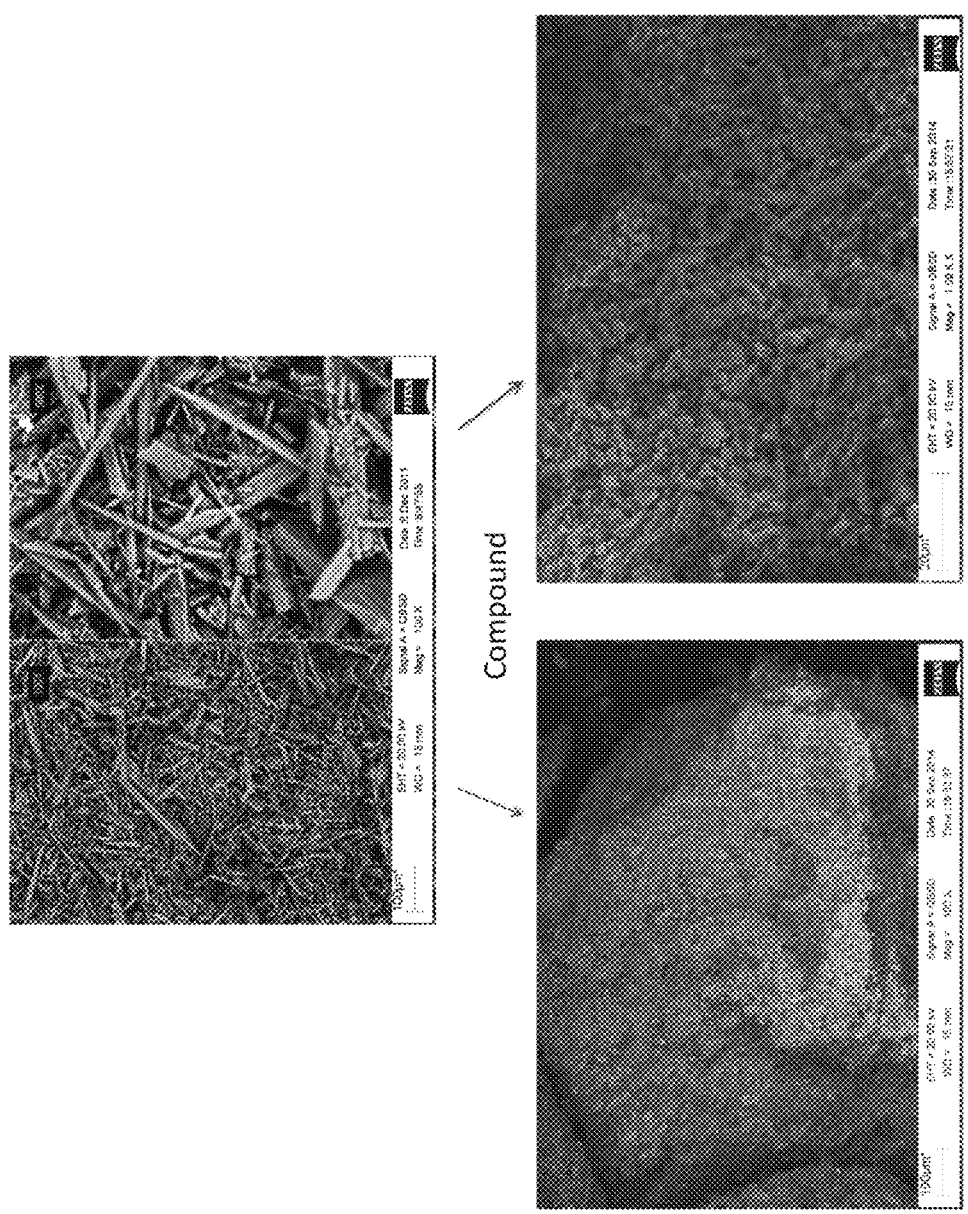
FIG. 2 illustrates the results of a diffraction analysis and a SEM analysis performed at two different magnifications on one of the raw components of the friction material that can be made using the method of the invention before and after a step of the method of the invention.

Finally, from FIG. 2, it is clear that the treatment according to the method of the invention provides a much finer and homogeneous microstructure of the fiber material with loss of the overall fibrous structure. The greater homogeneous nature of the friction material obtained by means of the method of the invention is particularly advantageous, both in terms of performance and robustness of the friction material.

The objectives of the invention are therefore fully achieved.

The invention claimed is:

1. A method for manufacturing an asbestos-free friction material comprising as raw component materials inorganic and/or organic and/or metallic fibers, at least one organic binder, at least one friction modifier or lubricant and at least a filler or abrasive, the method comprising:
   a mixing step involving the raw component materials of the friction material in order to obtain a raw mixture; and
   a molding step in which the raw mixture is molded under pressure in order to obtain a block or layer of friction material;
   wherein the mixing step comprises the steps of:
   a) a first hot blending step carried out by feeding at least part of the at least one organic binder and at least part of at least one other raw component material of the friction material in a first mixer provided with at least two hot rotating rollers and open to atmospheric pressure in order to have the at least part of the organic binder and said at least part of said other raw component material of the friction material passing through the rollers in a gap delimited therebetween at a temperature which is lower than the polymerization temperature of the organic binder, in order to obtain at atmospheric pressure and after the rollers a semifinished solid product in the shape of chips or ribbon or sheet; and
   b) a grinding step of the semifinished solid product, in order to completely reduce the semifinished solid product to a powder; and
   c) a second blending step performed in a second mixer, the second blending step being performed prior to or after the first hot blending step and including at least the remaining raw components of the friction material.

2. The method according to claim 1, wherein the second blending step is performed after the first hot blending step and the grinding step, wherein the other raw component materials of the friction material and the powder obtained by the grinding of the semifinished solid product are introduced within the second mixer.

3. The method according to claim 2, wherein the powder obtained by the grinding of the semifinished solid product is subjected to a sieving step prior to the second blending step in order to obtain the raw mixture.

4. The method according to claim 1, wherein the second blending step is performed before the first blending step and the grinding step, wherein the other raw component materials of the friction material are introduced within a second mixer.

5. The method according to claim 1, wherein the organic binder used in the first hot blending step, consists of a polymer selected from the group consisting of:
   at least a thermosetting polymer; at least a thermoplastic polymer; or mixtures thereof.

6. The method according to claim 5, wherein the organic binder used in the first hot blending step is in a powder form.

7. The method according to claim 1, wherein during the first hot blending step configured to obtain the semifinished solid product, all the organic binder and part of the raw component materials of the friction material are mixed with each other.

8. The method according to claim 1, wherein the product obtained by the grinding of the semifinished solid product that is used to form the raw mixture has a particle size of between 5 and 500 microns.

9. The method according to claim 1, wherein during the first blending step configured to obtain the semifinished solid product all the organic binder and part or the totality of the raw component materials of the friction material having a fibrous structure are mixed with each other.

* * * * *